United States Patent
Cho (10) Patent No.: US 9,834,195 B2
(45) Date of Patent: Dec. 5, 2017

(54) APPARATUS FOR CONTROLLING TRANSMISSION SYSTEM OF HYBRID ELECTRIC VEHICLE AND METHOD THEREOF

(71) Applicant: HYUNDAI MOTOR COMPANY, Seoul (KR)

(72) Inventor: Jinkuk Cho, Goyang-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/212,686

(22) Filed: Jul. 18, 2016

(65) Prior Publication Data

US 2017/0166183 A1 Jun. 15, 2017

(30) Foreign Application Priority Data

Dec. 14, 2015 (KR) ........................ 10-2015-0178658

(51) Int. Cl.
*B60K 6/445* (2007.10)
*B60W 20/10* (2016.01)
(Continued)

(52) U.S. Cl.
CPC ............. *B60W 20/10* (2013.01); *B60K 6/365* (2013.01); *B60W 10/06* (2013.01); *B60W 10/08* (2013.01); *B60W 10/115* (2013.01); *F16H 3/728* (2013.01); *F16H 37/04* (2013.01); *F16H 37/0806* (2013.01); *B60W 2510/0657* (2013.01); *B60W 2710/0644* (2013.01); *B60W 2710/083* (2013.01); *F16H 2200/0021* (2013.01); *F16H 2200/2005* (2013.01); *F16H 2200/2033* (2013.01); *Y10S 903/903* (2013.01); *Y10S 903/945* (2013.01)

(58) Field of Classification Search
None
See application file for complete search history.

(56) References Cited

U.S. PATENT DOCUMENTS 6,258,006 B1 * 7/2001 Hanyu ................ B60K 6/365
475/5
8,500,589 B2 * 8/2013 Ortmann ............. B60K 6/387
475/152

FOREIGN PATENT DOCUMENTS

JP 2009-166793 A 7/2009
JP 2010-235070 A 10/2010
(Continued)

*Primary Examiner* — Dirk Wright
(74) *Attorney, Agent, or Firm* — Brinks Gilson & Lione (57) ABSTRACT

An apparatus for controlling a transmission system of a hybrid electric vehicle may include: a planetary gear set disposed on an input shaft; two input gears connected to rotation elements of a sun gear, a ring gear and a planet carrier of the planetary gear set; first and second motor/generators disposed on an intermediate shaft and a connecting shaft disposed in parallel with the input shaft; two intermediate gears connected respectively to a rotor of the first and second motor/generators; a brake selectively braking the rotor of the first motor/generator; two output gears; a hydraulic pump; and a controller. The controller performs a hydraulic pressure control for the brake through the hydraulic pump to lock up the brake when a conversion condition is satisfied, and a reaction force control for the sun gear when a driving mode is converted from a power split mode to an engine coupling mode.

13 Claims, 6 Drawing Sheets

(51) Int. Cl.
 *F16H 3/72* (2006.01)
 *F16H 37/08* (2006.01)
 *F16H 37/04* (2006.01)
 *B60W 10/08* (2006.01)
 *B60W 10/06* (2006.01)
 *B60W 10/115* (2012.01)
 *B60K 6/365* (2007.10)

(56) References Cited

FOREIGN PATENT DOCUMENTS

| | | |
|---|---|---|
| JP | 2015-024763 A | 2/2015 |
| KR | 10-2015-0061676 A | 6/2015 |
| KR | 10-1619637 | 5/2016 |

* cited by examiner

APPARATUS FOR CONTROLLING TRANSMISSION SYSTEM OF HYBRID ELECTRIC VEHICLE AND METHOD THEREOF

CROSS-REFERENCE TO RELATED APPLICATION

This application claims priority to and the benefit of Korean Patent Application No. 10-2015-0178658, filed on Dec. 14, 2015, which is incorporated herein by reference in its entirety.

FIELD

The present disclosure relates to an apparatus and a method for controlling a transmission system.

BACKGROUND

The statements in this section merely provide background information related to the present disclosure and may not constitute prior art.

Generally, a hybrid electric vehicle is a vehicle which uses two different power sources efficiently.

Such a hybrid electric vehicle typically uses an engine and a motor/generator. The hybrid electric vehicle uses the motor/generator having relatively better low-speed torque characteristics as a main power source at a low-speed and uses an engine having relatively better high-speed torque characteristics as a main power source at a high-speed.

Since the hybrid electric vehicle stops operation of the engine using the fossil fuel and instead uses the motor/generator at a low-speed region, fuel consumption efficiency may be improved and exhaust gas may be reduced.

The power transmission system of a hybrid electric vehicle is classified into a single-mode type and a multi-mode type.

A torque delivery apparatus such as clutches and brakes for shift control is not necessary, but fuel consumption is high due to deterioration of efficiency at a high-speed region and an additional torque multiplication device is desired for being applied to a large vehicle according to the single-mode type.

Since the multi-mode type has high efficiency at the high-speed region and is able to multiply torque autonomously, the multi-mode type can be applied to a full size vehicle.

Therefore, the multi-mode type instead of the single-mode type is applied as the power transmission system to a hybrid electric vehicle and is also under continuous investigation.

The power transmission system of the multi-mode type includes a plurality of planetary gear sets, a plurality of motor/generators operated as a motor and/or a generator, a plurality of torque delivery apparatus controlling rotation elements of the planetary gear sets, and a battery used as a power source of the motor/generators.

The driving mode of the power transmission system having the multi-mode type can be divided into an EV mode (electric vehicle mode) that only uses the motor/generator as a power source and a HEV mode (hybrid electric vehicle mode) that uses the engine and the motor/generator as a power source.

Further, the HEV mode can be divided into a power split mode and an over drive mode (engine coupling mode) according to a type of the power transmission system. We have discovered that if the driving mode of the power transmission system is appropriately converted from the power split mode to the engine coupling mode, it is possible to improve driving efficiency.

Therefore, converting method of the driving mode has been studied.

SUMMARY

The present disclosure provides an apparatus and a method for controlling a transmission system that converts a driving mode from a power split mode to an engine coupling mode.

An apparatus for controlling a transmission system of a hybrid electric vehicle according to the present disclosure may include: a planetary gear set disposed on an input shaft receiving power of an engine; two input gears connected respectively to two rotation elements among three rotation elements of a sun gear, a ring gear and a planet carrier of the planetary gear set; first and second motor/generators disposed on an intermediate shaft and a connecting shaft disposed in parallel with the input shaft; two intermediate gears connected respectively to first and second rotors of the first and second motor/generators; a brake selectively connecting the first rotor of the first motor/generator to a transmission housing; two output gears fixedly disposed on an output shaft disposed in parallel with the intermediate shaft and transmitting power transmitted through one input gear of the two input gears and/or one intermediate gear of the two intermediate gears to a final reduction gear of a differential apparatus; a hydraulic pump supplying hydraulic pressure required to lock up the brake; and a controller performing a hydraulic pressure control that controls hydraulic pressure supplied to the brake through the hydraulic pump so that locks up the brake when a conversion condition is satisfied, and performing a reaction force control that controls reaction force of the sun gear connected to the first motor/generator among the three rotation elements of the planetary gear set when a driving mode of a vehicle is converted from a power split mode to an engine coupling mode.

The hydraulic pressure control may control hydraulic pressure supplied to the brake through the hydraulic pump, and is divided into a slip control and a nonslip control according to a brake capacity.

The slip control may supply an initial hydraulic pressure to the brake, supply a middle control hydraulic pressure increased with rotation speed of the first motor/brake to the brake, and supply a maintaining hydraulic pressure the brake when the brake is locked up.

The nonslip control may supply an initial hydraulic pressure to the brake, supply a maximum hydraulic pressure for locking up the brake, and supply a maintaining hydraulic pressure to the brake when the brake is locked up.

When the reaction force control is performed by the controller, torque of the first motor/generator may be determined by summation of a reaction torque of an engine torque and a speed control torque for controlling an engine speed, the torque the first motor/generator is determined by an equation of $$M_T = \frac{-1}{1+R} \times E_T + M_{sc},$$

wherein R denotes tooth number of the ring gear/tooth number of the sun gear, Et denotes an engine torque that the efficiency of the engine is maximized, and Msc denotes the speed control torque for controlling the engine speed.

When the brake is locked up, the controller may sets the torque of the first motor/generator to be zero.

The conversion condition may be satisfied when a vehicle speed is lower than a reference speed for converting the driving mode to the engine coupling mode, a driver required power is less than a reference power for converting the driving mode to the engine coupling mode, and an absolute value of the first motor/generator speed is within a predetermined range over a predetermined time.

The present disclosure provides a method for controlling a transmission system of a hybrid electric vehicle including a planetary gear set disposed on an input shaft receiving power of an engine; two input gears connected respectively to two rotation elements among three rotation elements of a sun gear, a ring gear and a planet carrier of the planetary gear set; first and second motor/generators disposed on an intermediate shaft and a connecting shaft disposed in parallel with the input shaft; two intermediate gears connected respectively to first and second rotors of the first and second motor/generators; a brake selectively connecting the first rotor of the first motor/generator to a transmission housing; and two output gears fixedly disposed on an output shaft disposed in parallel with the intermediate shaft and transmitting power transmitted through one input gear of the two input gears and/or one intermediate gear of the two intermediate gears to a final reduction gear of a differential apparatus. The method may include: determining, by a controller, whether a conversion condition for converting a driving mode from a power split mode to an engine coupling mode is satisfied; performing, by the controller, a slip control or a nonslip control supplying control hydraulic pressure to the brake for locking up the brake according to the brake capacity through an oil pump when a driving mode is the power split mode and the conversion condition is satisfied; and performing a reaction force control for controlling reaction force of the sun gear connected to the first motor/generator among the three rotation elements of the planetary gear set, by the controller.

The conversion condition may be satisfied when a vehicle speed is lower than a reference speed for converting the driving mode to the engine coupling mode, a driver required power is less than a reference power for converting the driving mode to the engine coupling mode, and an absolute value of the first motor/generator speed is within a predetermined range over a predetermined time.

The slip control may include supplying an initial hydraulic pressure to the brake; supplying a middle control hydraulic pressure to the first motor/generator; and supplying a maintaining hydraulic pressure to the brake when the brake is locked up.

The middle control hydraulic pressure may be increased with a rotation speed of the first motor/generator between the initial hydraulic pressure and a maximum hydraulic pressure for locking the brake.

The nonslip control may include supplying an initial hydraulic pressure to the brake; supplying a maximum hydraulic pressure that the brake is locked up; and supplying a maintaining hydraulic pressure to the brake when the brake is locked up.

Under the reaction force control, a torque of the first motor/generator may be controlled for dividing engine power to the ring gear and the sun gear of the planetary gear set, and the torque of the first motor/generator is determined by summation of a reaction torque of an engine torque and a speed control torque for controlling an engine speed, and in particular, the torque of the first motor/generator is determined from following equation of $$M_T = \frac{-1}{1+R} \times E_T + M_{sc},$$

wherein R denotes tooth number of the ring gear/tooth number of the sun gear, Et denotes an engine torque that the efficiency of the engine is maximized, and Msc denotes the speed control torque for controlling the engine speed.

According to another form of the present disclosure, since a power split mode and an engine coupling mode are converted according to driving conditions, it is possible to improve fuel consumption.

Further, since a hydraulic pressure control and a reaction force control of a sun gear are selectively performed according to a brake capacity when a driving mode is converted from the power split mode to the engine coupling mode, it is possible to improve drivability during mode conversion.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As those skilled in the art would realize, the described forms may be modified in various different ways, all without departing from the spirit or scope of the present disclosure.

In describing the present disclosure, parts that are not related to the description will be omitted.

In the detailed description, ordinal numbers are used for distinguishing constituent elements having the same terms, and have no specific meanings.

Hereinafter, an apparatus for controlling a transmission system of a hybrid vehicle according to one form of the present disclosure will be described in detail with drawings.

Figure 1:
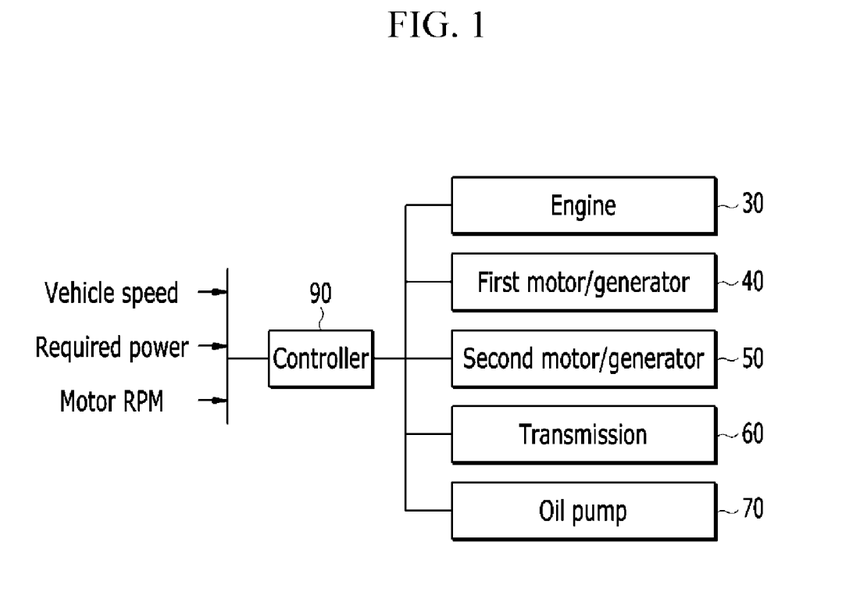
FIG. 1 is a block diagram of an apparatus for controlling a transmission system of a hybrid electric vehicle.
Figure 2:
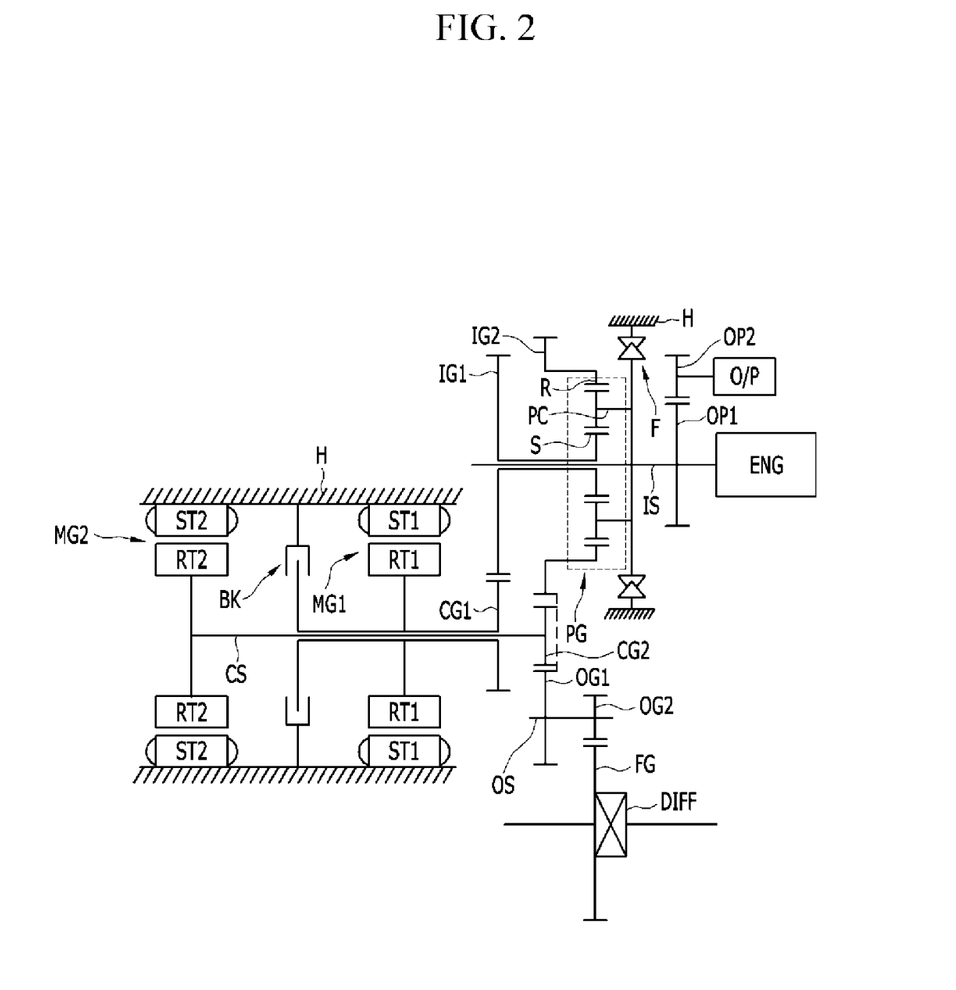
FIG. 2 is a schematic diagram of a transmission system of a hybrid electric vehicle.
Figure 3:
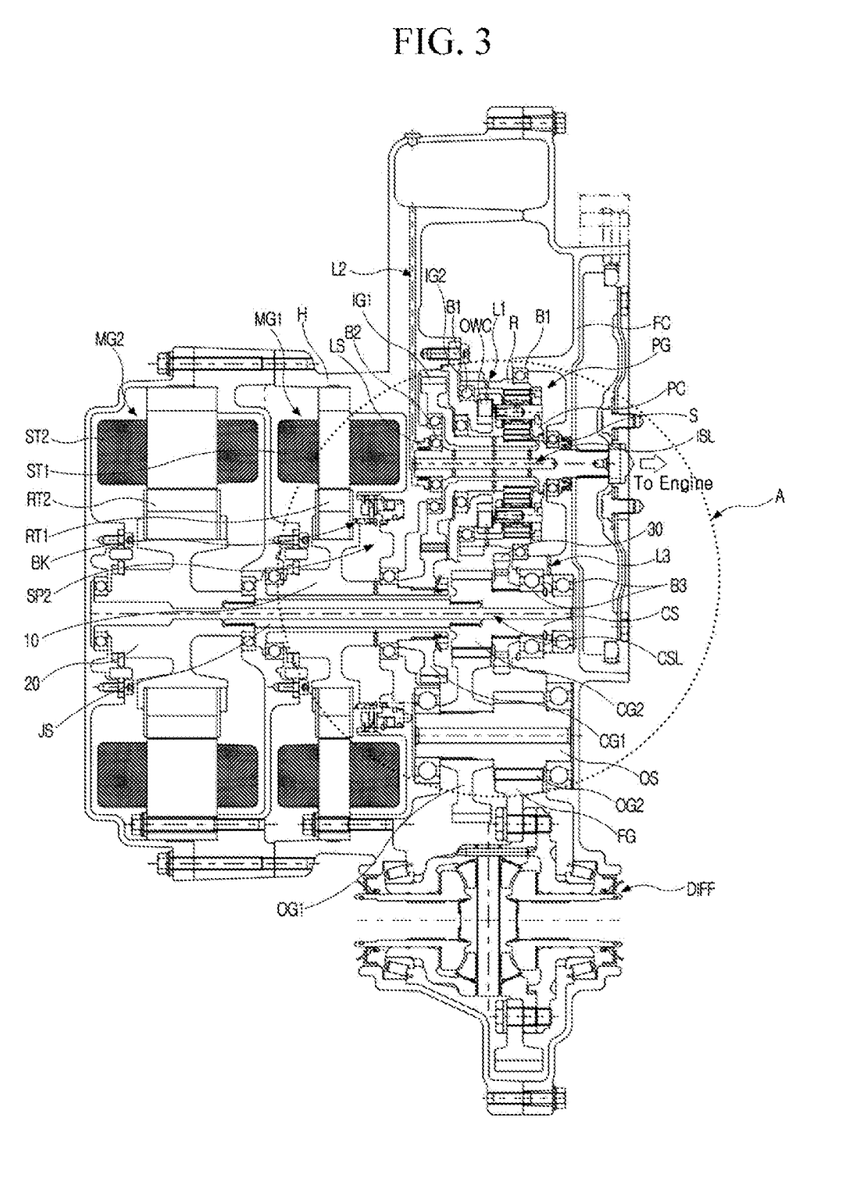
FIG. 3 is a cross-sectional view of a transmission system of a hybrid electric vehicle.

Referring to FIGS. 1 and 2, an apparatus for controlling a transmission system of a hybrid vehicle according to one form of the present disclosure includes: an engine ENG and first and second motor/generators MG1 and MG2 as power sources, and an input shaft IS, a planetary gear set PG, first and second input gears IG1 and IG2, an intermediate shaft CS, first and second intermediate gears CG1 and CG2, a brake BK, an output shaft OS, first and second output gears OG1 and OG2, and a final reduction module.

The engine ENG is a main power source, and a gasoline engine or a diesel engine using conventional fossil fuel may be used as the engine.

Power generated by the engine ENG is transmitted to a transmission side through input means, and the input means may be connected to an output side of the engine ENG through a damper and/or a clutch or be connected to the output side of the engine ENG directly without interposing the damper and/or the clutch therebetween.

The planetary gear set PG, two input gears IG1 and IG2 and two intermediate gears CG1 and CG2, the first motor/generator MG1, and the second motor/generator MG2 are sequentially disposed from the engine rearward.

An input shaft hydraulic line ISL (please refer to FIG. 2) is formed in the input shaft IS, and the input shaft IS is operably connected to the engine ENG so as to receive the power of the engine ENG.

The planetary gear set PG is a single pinion planetary gear set, and includes a sun gear S, a ring gear R, and a planet carrier PC rotatably supporting a plurality of pinions engaging with the sun gear S and the ring gear R.

The sun gear S is directly connected to the first input gear IG1, the planet carrier PC is directly connected to the input shaft IS, and the ring gear R is directly connected to the second input gear IG2.

In addition, the planet carrier PC as well as the input shaft IS is connected to a transmission housing H through a one-way clutch F and may be prevented from rotating in one direction.

The intermediate shaft CS is disposed apart from and in parallel with the input shaft IS, and the first and second motor/generators MG1 and MG2 are disposed on the intermediate shaft CS and a connecting shaft JS concentrically connected thereto (please refer to FIG. 2).

The first motor/generator MG1 includes a first stator ST1 fixed to the transmission housing H and a first rotor RT1 rotatably supported at a radial inside of the first stator ST1.

In addition, the first rotor RT1 is connected to the first intermediate gear CG1 through a first hub 10, and the first intermediate gear CG1 is engaged with the first input gear IG1 (please refer to FIG. 2).

The first motor/generator MG1 can operate as a generator by the power of the engine ENG input through the first input gear IG1.

Electrical energy generated by the first motor/generator MG1 is charged into a battery (not shown) or is supplied to the second motor/generator MG2.

In addition, when the vehicle drives with high speed or the engine is started, the first motor/generator MG1 can operate as a motor outputting inverse driving torque.

The second motor/generator MG2 includes a second stator ST2 fixed to the transmission housing H and a second rotor RT2 rotatably supported at a radial inside of the second stator ST2.

Herein, since the second motor/generator MG2 is disposed at the rearmost in the transmission housing H, the hollow connecting shaft JS is splined to a second hub 20 connected to the second rotor RT2 and a rear end portion of the intermediate shaft CS. An intermediate shaft hydraulic line CSL is formed in the second hub 20, the connecting shaft JS, and the intermediate shaft CS. Lubrication oil may be supplied to the first motor/generator MG1 through the intermediate shaft hydraulic line CSL of the connecting shaft JS by centrifugal force (please refer to FIG. 2).

The second hub 20 connected to the second rotor RT2 of the second motor/generator MG2 is connected to the second intermediate gear CG2 formed on the intermediate shaft CS through the connecting shaft JS.

At this time, the first hub 10 connected to the first rotor RT1 of the first motor/generator MG1 is rotatably disposed on the connecting shaft JS.

The second motor/generator MG2 can mainly operate as a motor assisting driving torque for driving the vehicle, and can operate as a generator converting inertial energy into electrical energy when vehicle decelerates.

In addition, the brake BK is configured to selectively connect the first rotor RT1 of the first motor/generator MG1 to the transmission housing H.

The brake BK operates at engine coupling (overdrive) mode when the sun gear S of the planetary gear set PG is operated as a fixed element.

The brake BK may be a conventional multi-plate friction element that is operated by hydraulic pressure, and may be controlled by hydraulic control system (not shown).

In addition, the output shaft OS is disposed apart from and in parallel with the input shaft IS and the intermediate shaft CS. The first output gear OG1 and the second output gear OG2 are fixedly disposed respectively on both end portions of the output shaft OS.

The first output gear OG1 is engaged with the second input gear IG2 and the second intermediate gear CG2, and the second output gear OG2 is operably connected to the final reduction module.

The final reduction module includes a differential apparatus DIFF and a final reduction gear FG, and the final reduction gear FG is engaged with the second output gear OG2 so as to finally decelerate power transmitted from the output shaft OS and transmit the decelerated power to a driving wheel through the differential apparatus DIFF.

A non-explained symbol O/P in FIG. 2 denotes a hydraulic pump, and the hydraulic pump receives the power of the input shaft IS and generates hydraulic pressure demanded by the transmission through a hydraulic pump drive gear OP1 disposed on the input shaft IS and a hydraulic pump driven gear OP2 engaged thereto.

The transmission system of a hybrid electric vehicle can achieve an electric vehicle (EV) mode, a power split mode, and an engine coupling (OD: over drive) mode.

In a state that the engine ENG is stopped, driving torque of the second motor/generator MG2 is transmitted to the final reduction gear FG of the differential apparatus DIFF through the intermediate shaft CS, the second intermediate gear CG2, the first output gear OG1, the output shaft OS, and the second output gear OG2 at the EV mode.

At this time, electric continuously variable shifting may be achieved by controlling rotation speed of the second motor/generator MG2.

In addition, the power of the engine ENG is transmitted as driving torque for driving the vehicle and as driving torque for generating electricity at the first motor/generator MG1, and power of the second motor/generator MG2 is used as auxiliary power at the power split mode.

That is, the engine ENG is started by the first motor/generator MG1 and the power of the engine ENG is split at the planetary gear set PG. A portion of the power of the engine ENG is transmitted to the driving wheel through the second input gear IG2, the first output gear OG1, the output shaft OS, the second output gear OG2, and the final reduction gear FG of the differential apparatus DIFF, and the other portion of the power of the engine ENG is transmitted to the first motor/generator MG1 through the first input gear IG1 and the first intermediate gear CG1 as driving torque for generating electricity.

Electrical energy generated by the first motor/generator MG1 is used to operate the second motor/generator MG2 or is charged into the battery (not shown).

In addition, power of the second motor/generator MG2 that is used as auxiliary power is transmitted to the driving wheel through the intermediate shaft CS, the second intermediate gear CG2, the first output gear OG1, the output shaft OS, the second output gear OG2, and the final reduction gear FG of the differential apparatus DIFF.

At the power split mode, DOF (degree of freedom) for moving operating point is very high. Therefore, the engine is operated by selecting most efficiency operating point at the power split mode. At this time, the operating point of the engine may be determined from a BSFC (Brake Specific Fuel Consumption) map representing fuel consumption rate information in a contour form.

There is a merit that the operating point of the engine is freely moved at the power split mode, but a reaction torque should be supplied to the ring gear R, the sun gear S, and the planet carrier PC due to the characteristic of the planetary gear.

Referring to FIG. 2, the sun gear S is connected to the first motor/generator, the reaction force supplied to the sun gear S is controlled through the first motor/generator. The driving wheel and the second motor/generator are connected to the ring gear R of the planetary gear set, and freewheeling of the driving wheel is limited.

In addition, the brake BK is operated and the sun gear S of the planetary gear set PG is operated as the fixed element at the engine coupling (OD) mode.

In this case, rotation speed of the engine ENG is increased by the planetary gear set PG and the increased rotation speed is transmitted to the driving wheel through the second input gear IG2, the first output gear OG1, the output shaft OS, the second output gear OG2, and the final reduction gear FG of the differential apparatus DIFF.

In addition, power of the second motor/generator MG2 that is used as auxiliary power is transmitted to the driving wheel through the intermediate shaft CS, the second intermediate gear CG2, the first output gear OG1, the output shaft OS, the second output gear OG2, and the final reduction gear FG of the differential apparatus DIFF.

At the engine coupling mode, a gear ratio between the engine and second motor/generator MG2 is fixed to a particular gear ratio by locking up the brake BK connected to the sun gear S of the planetary gear set PG At this time, the gear ratio between the engine and second motor/generator MG2 may be a gear ration corresponding to the engine coupling mode (over drive mode) of a conventional automatic transmission.

Meanwhile, the apparatus for controlling the transmission system of the hybrid vehicle according to one form of the present disclosure includes a controller 90 that controls an operation of the transmission 60, the engine 30, the first motor/generator 40 and the second motor/generator 50.

The controller 90 may be implemented by one or more processors operated by a predetermined program, in which the predetermined program is set to perform steps of a method for controlling the transmission system of the hybrid vehicle according to another form of the present disclosure.

The controller 90 includes a motor control unit (MCU), a transmission control unit (TCU) and an engine 30 control unit (ECU).

When a driving mode is converted from the power split mode to the engine coupling mode, the controller 90 performs a hydraulic pressure control for locking up the brake BK and a reaction force control for controlling reaction force of the sun gear S connected to the first motor/generator when a conversion condition for converting is satisfied.

The hydraulic pressure control is a control that controls hydraulic pressure supplied to the brake BK through the hydraulic pump O/P, and the controller 90 performs a slip control and a nonslip control according to the brake BK capacity. That is, the controller 90 performs the slip control when the brake BK capacity is high, and the controller 90 performs the nonslip control when the brake BK capacity is low.

The brake BK capacity is determined by parameters, such as, a disk size and a disk pad size, the brake BK capacity is predetermined during manufacturing process of the vehicle, and is stored in the controller 90.

When the slip control is performed by the controller 90, the controller 90 supplies an initial hydraulic pressure to the brake BK and supplies a middle control hydraulic to the brake BK when a driving mode of the vehicle is converted from the power split mode to the engine coupling mode.

The middle control hydraulic pressure is increased according to rotation speed of the first motor/generator. That is, the middle control hydraulic pressure is gradually increased from the initial hydraulic pressure to a maximum hydraulic pressure to lock up the brake BK.

When the brake BK is locked up, the controller 90 supplies a maintaining hydraulic pressure to maintain the lock-up of the brake. The maintaining hydraulic pressure for maintaining lock-up of the brake is less than the maximum hydraulic pressure.

For example, if the maximum hydraulic pressure for locking up the brake is 10 bar, the maintaining hydraulic pressure may be 5 bar which is less than the maximum hydraulic pressure. The initial hydraulic pressure may be set to 1 bar, and the middle control hydraulic pressure is gradually increased from the middle control hydraulic pressure from 1 bar to 10 bar.

When the nonslip control is performed by the controller 90, the controller 90 supplies an initial hydraulic pressure to the brake BK and supplies a maximum hydraulic pressure for locking up the brake BK when the driving mode of the vehicle is converted from the power split mode to the engine coupling mode.

When the brake is locked up, the controller 90 supplies a maintaining hydraulic pressure for maintaining lock-up of the brake to the brake.

The middle hydraulic pressure is supplied to the brake BK after the initial hydraulic pressure is supplied to the brake BK at the slip control, but the middle hydraulic pressure is not supplied to the brake BK at the nonslip control.

If the brake capacity is high, the controller 90 controls the brake BK to be locked up as decreasing rotation speed of the first motor/generator through the slip control. However, if the brake capacity is small, the controller 90 does not perform the slip control and controls the brake to be locked up by supplying the maximum hydraulic pressure to the brake BK.

The reaction force control is that controls reaction force of the sun gear connected to the first motor/generator when the driving mode is converted from the power split mode to the engine coupling mode due to the characteristic of the planetary gear set PG. The torque of the first motor/generator is controlled in order to distribute engine power to the ring gear and the sun gear at the reaction force control.

When the controller 90 performs the reaction force control, the controller 90 controls the torque of the first motor/generator. At this time, the torque of the first motor/generator is determined as summation of the reaction torque and the engine torque.

The torque of the first motor/generator may be calculated as following equation 1.

$$M_T = \frac{-1}{1+R} \times E_T + M_{sc} \quad \text{(Equation 1)}$$

wherein Mt denotes the torque of the first motor/generator, Et denotes the engine torque, and R denotes tooth number of the ring gear/tooth number of the sun gear.

At the equation 1, $$\frac{-1}{1+R} \times E_T$$

denotes the reaction torque of the sun gear S, $E_T$ denotes the engine torque, and $M_{sc}$ denotes a speed control torque of the first motor/generator for controlling the engine speed. The $M_{sc}$ is a torque for controlling engine speed such that a current engine speed reaches a target engine speed.

The engine torque before the maximum hydraulic pressure is supplied to the brake BK may be a maximum efficiency torque that the efficiency of the engine is maximized. The maximum efficiency torque may be determined from the BSFC (Brake Specific Fuel Consumption) map. The BSFC map represents fuel consumption rate information in a contour form.

The engine torque before the brake is locked up after the initial hydraulic pressure is supplied to the brake maintains the maximum efficiency torque. But the torque of the first motor/generator is set as summation of the reaction torque of the engine torque and the speed control torque for controlling the rotation speed of the first motor/generator to be zero.

If the brake is locked up, the controller 90 sets the reaction torque to be zero.

Hereinafter, a conversion process from the power split mode to the engine coupling mode (OD mode) will be described in detail.

Figure 4:
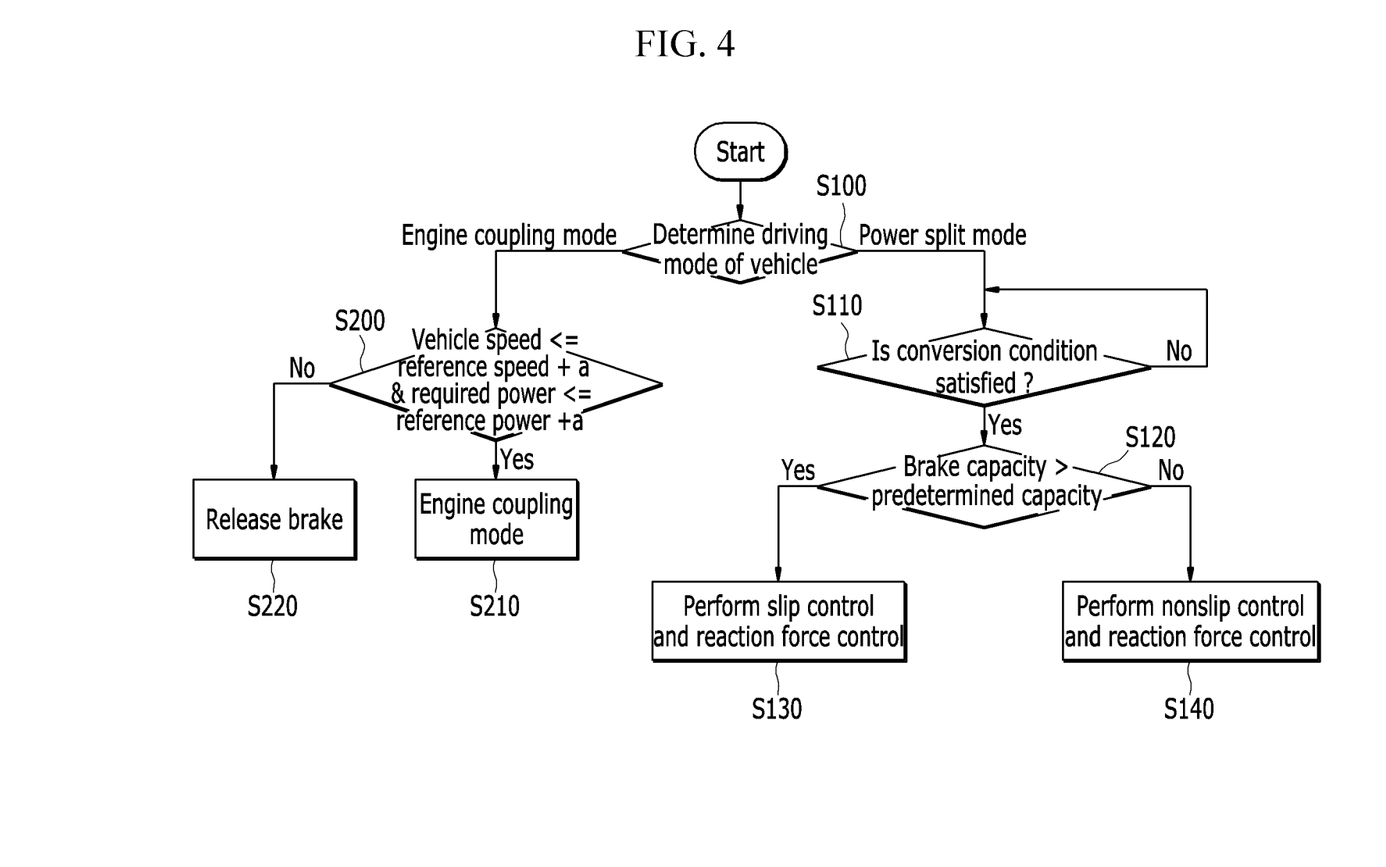
FIG. 4 is a flowchart of an apparatus for controlling a transmission system of a hybrid electric vehicle.

FIG. 4 is a flowchart of an apparatus for controlling a transmission system of a hybrid electric vehicle according to one form of the present disclosure.

Referring to FIG. 4, the controller 90 determines whether the driving mode of the vehicle is the power split mode or the engine coupling mode at step S100.

When the driving mode of the vehicle is the power split mode, the controller 90 determines whether the conversion condition is satisfied, indicating the the driving mode may be converted from the power split mode to the engine coupling mode at step S110.

The conversion condition may be satisfied when a vehicle speed is lower than a reference speed for converting the driving mode to the engine coupling mode, a driver required power is less than a reference power for converting the driving mode to the engine coupling mode, and an absolute value of the first motor/generator speed is within a predetermined range over a predetermined time.

At this time, determining whether that the absolute value of the rotation speed of the first motor generator is within the predetermined range over the predetermined time is to clearly determine driver's intension.

When the conversion condition is satisfied, the controller 90 determines whether the brake capacity is greater than a predetermined capacity at step S120. The brake capacity may be determined at the manufacturing process and be stored in the controller 90.

When the brake capacity is greater than the predetermined capacity, the controller 90 performs the slip control supplying control hydraulic pressure to the brake for locking up the brake and the reaction force control controlling the reaction force of the sun gear connected to the first motor/generator at step S130.

When the brake capacity is less than the predetermined capacity, the controller 90 performs the nonslip control supplying the control hydraulic pressure to the brake for locking up the brake and the reaction force control controlling the reaction force of the sun gear connected to the first motor/generator at step S140.

The slip control and the reaction force control will be described in detail.

Figure 5:
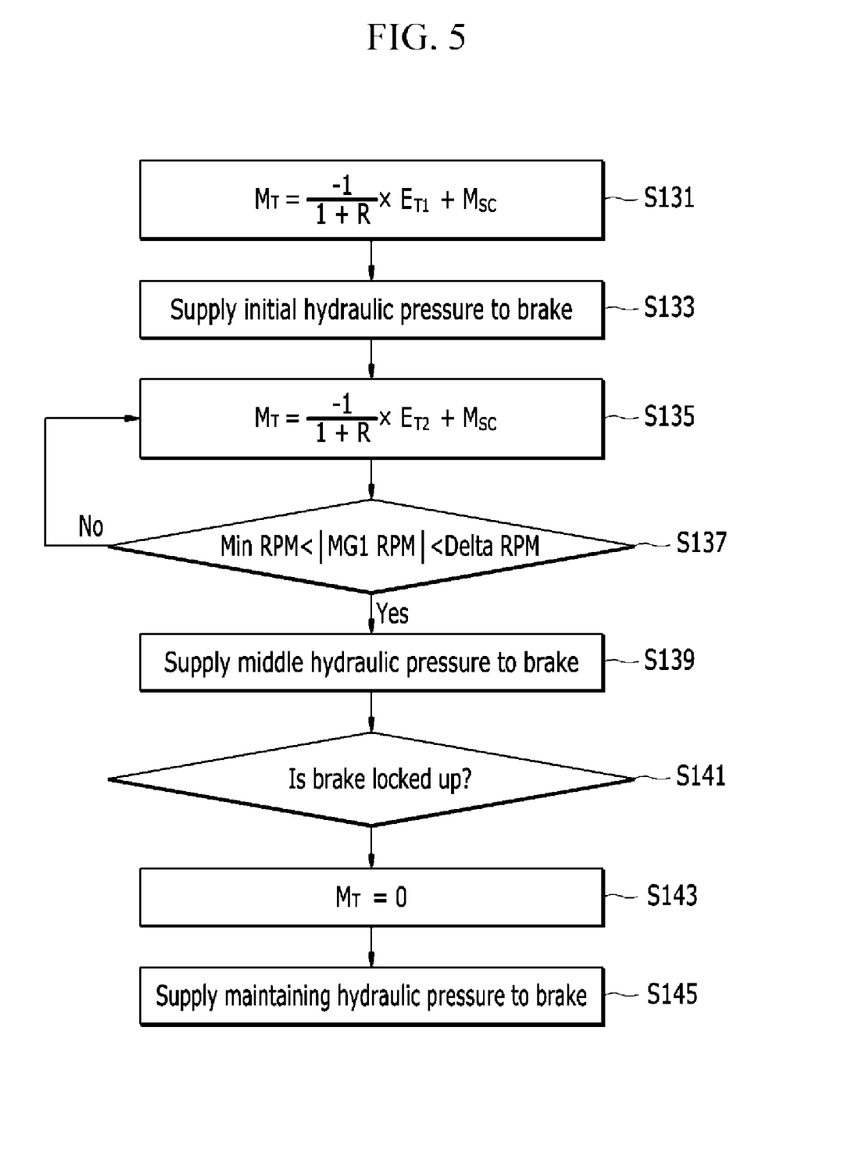
FIG. 5 is a flowchart of a slip control and reaction force control method.

FIG. 5 is a flowchart of a slip control and reaction force control method according to one form of the present disclosure.

Referring to FIG. 5, when the conversion condition is satisfied at step S110 and the brake capacity is greater than the predetermined capacity at step S120, the controller 90 sets the torque of the first motor/generator as an summation of the reaction torque and the speed control torque for controlling the engine speed at step S131. The torque of the first motor/generator may be determined as following equation 2.

$$M_T = \frac{-1}{1+R} \times E_{T1} + M_{sc} \quad \text{(Equation 2)}$$

Wherein Mt denotes the torque of the first motor/generator, Et1 denotes the engine torque, R denotes tooth number of the ring gear/tooth number of the sun gear, and $M_{sc}$ denotes a speed control torque of the first motor/generator for controlling the engine speed.

The Et1 is a maximum efficiency torque that the efficiency of the engine is maximized. The maximum efficiency torque may be determined from the BSFC (Brake Specific Fuel Consumption) map as described above.

The controller 90 supplies the initial hydraulic pressure to the brake BK at step S133.

The controller 90 sets the torque of the first motor/generator from following equation 3 at step S135.

$$M_T = \frac{-1}{1+R} \times E_{T2} + M_{sc} \quad \text{(Equation 3)}$$

Here, Mt denotes the torque of the first motor/generator, Et2 denotes the engine torque, R denotes tooth number of the ring gear/tooth number of the sun gear, and $M_{sc}$ denotes a speed control torque of the first motor/generator for controlling the engine speed.

At this time, the engine torque Et2 is the speed control torque for controlling the rotation speed of the first motor/generator to be zero by not taking the engine efficiency into consideration.

The controller 90 determines whether the rotation speed of the first motor/generator is within the predetermined range at step S137. That is, the controller 90 determines whether the absolute value of the rotation speed of the first motor/generator is greater than a minimum rotation speed (Min RPM) and less than a Delta RPM. The minimum rotation speed (Min RPM) may be determined by an experiment when the vehicle is developed.

When the rotation speed of the first motor/generator is within the predetermined range, the controller 90 supplies the middle hydraulic pressure to the brake BK at step S139. The middle control hydraulic pressure is increased as the rotation speed of the motor/generator is increased. A torque of the first motor/generator when the rotation speed of the first motor/generator reaches the minimum rotation speed becomes the maximum hydraulic pressure. The maximum hydraulic pressure is a hydraulic pressure to lock up the brake BK.

The controller 90 determines whether the brake BK is locked up at step S141. The brake BK is locked up when the hydraulic pressure supplied to the brake BK reaches the maximum hydraulic pressure.

When the brake BK is locked up, the controller 90 sets the torque of the first motor/generator to be zero at step S143.

The controller 90 supplies the maintaining hydraulic pressure for maintaining lock-up of the brake BK at step S145.

Hereinafter, the nonslip control and the reaction force control are described in detail.

Figure 6:
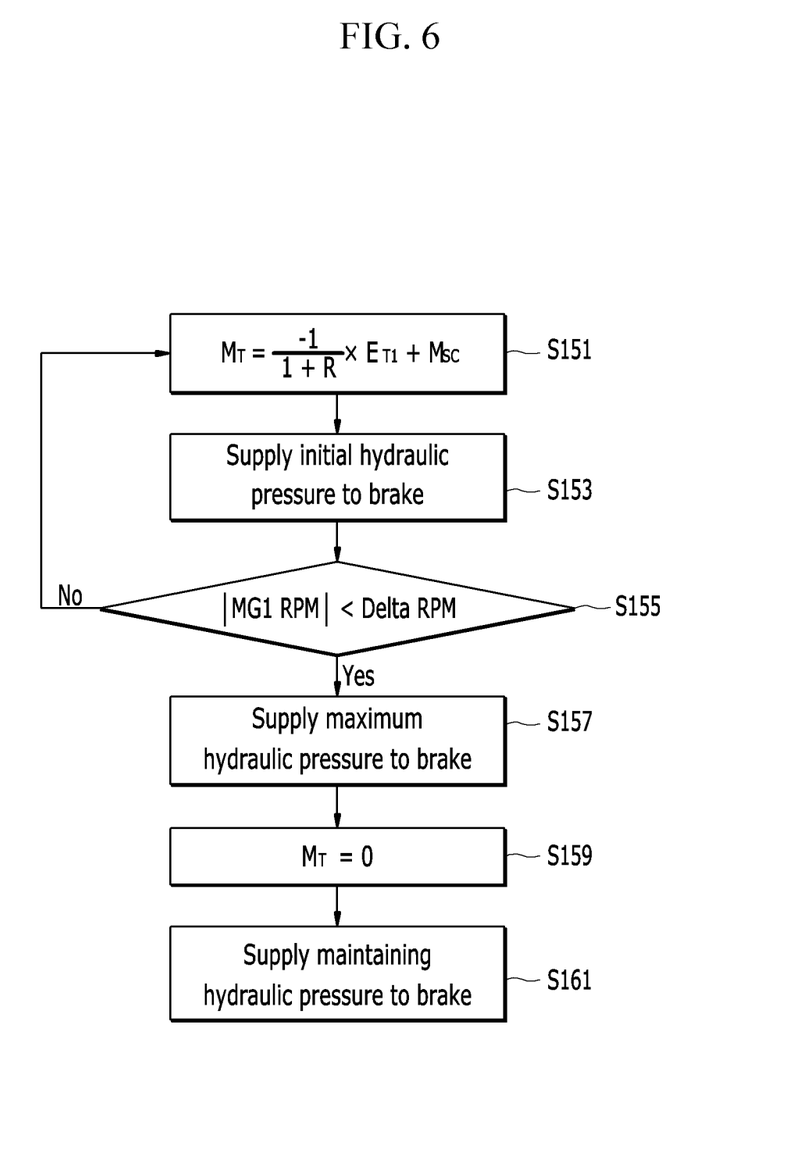
FIG. 6 is a flowchart of a non-slip control and reaction force control method.

FIG. 6 is a flowchart of a non-slip control and control and reaction force control method according to another form of the present disclosure.

Referring to FIG. 6, when the conversion condition is satisfied, the controller 90 sets the torque of the first motor/generator as summation of the reaction torque and the speed control torque for controlling the engine speed at step S151. The torque of the first motor/generator may be determined from the equation 2.

The controller 90 supplies the initial hydraulic pressure to the brake BK through the oil pump at step S153.

The controller 90 determines whether the rotation speed (MG1 RPM) of the first motor/generator is within the predetermined range at step S155. That is, the controller 90 determines whether an absolute value of the rotation speed of the first motor/generator is less than the Delta RPM.

When the rotation speed of the first motor/generator is within a predetermined range, the controller 90 supplies the maximum hydraulic pressure to the brake through the oil pump such that the brake is locked up at step S157.

The controller 90 sets the torque of the first motor/generator to zero at step S159, and supplies the maintaining hydraulic pressure for maintaining lock-up the brake to the brake through the oil pump S161.

While this present disclosure has been described in connection with what is presently considered to be practical forms, it is to be understood that the present disclosure is not limited to the disclosed forms, but, on the contrary, is intended to cover various modifications and equivalent arrangements included within the spirit and scope of the appended claims.

DESCRIPTION OF SYMBOLS

BK . . . brake
DIFF . . . differential
IS . . . input shaft
MG1, MG2 . . . first, second motor/generator
CS . . . intermediate shaft
CSL . . . intermediate shaft hydraulic line
JS . . . connecting shaft
CG1, CG2 . . . first, second intermediate gear
IG1, IG2 . . . first, second input gear
OG1, OG2 . . . first, second output gear
OS . . . output shaft
PG . . . planetary gear set While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the appended claims.

What is claimed is:

1. An apparatus for controlling a transmission system of a hybrid electric vehicle, the apparatus comprising:
   a planetary gear set disposed on an input shaft receiving power of an engine;
   two input gears connected respectively to two rotation elements among three rotation elements of a sun gear, a ring gear and a planet carrier of the planetary gear set;
   first and second motor/generators disposed on an intermediate shaft and a connecting shaft disposed in parallel with the input shaft;
   two intermediate gears connected respectively to first and second rotors of the first and second motor/generators;
   a brake configured to selectively connect the first rotor of the first motor/generator to a transmission housing;
   two output gears fixedly disposed on an output shaft disposed in parallel with the intermediate shaft and transmitting power transmitted through one input gear of the two input gears or one intermediate gear of the two intermediate gears to a final reduction gear of a differential apparatus;
   a hydraulic pump supplying hydraulic pressure to lock up the brake; and
   a controller configured to perform a hydraulic pressure control that controls hydraulic pressure supplied to the brake through the hydraulic pump so that locks up the brake when a conversion condition is satisfied, and the controller configured to perform a reaction force control that controls reaction force of the sun gear connected to the first motor/generator among the three rotation elements of the planetary gear set when a driving mode of a vehicle is converted from a power split mode to an engine coupling mode.

2. The apparatus of claim 1, wherein the hydraulic pressure control controls hydraulic pressure supplied to the brake through the hydraulic pump, and is divided into a slip control and a nonslip control according to a capacity of the brake.

3. The apparatus of claim 2, wherein the slip control supplies an initial hydraulic pressure to the brake, supplies a middle control hydraulic pressure increased with a rotation speed of the first motor/brake to the brake, and supplies a maintaining hydraulic pressure to the brake when the brake is locked up.

4. The apparatus of claim 2, wherein the nonslip control supplies an initial hydraulic pressure to the brake, supplies a maximum hydraulic pressure for locking up the brake, and supplies a maintaining hydraulic pressure to the brake when the brake is locked up.

5. The apparatus of claim 1, wherein when the reaction force control is performed by the controller, a torque of the first motor/generator is determined by summation of a reaction torque of an engine torque and a speed control torque for controlling an engine speed, the torque of the first motor/generator is determined by an equation of $$M_T = \frac{-1}{1+R} \times E_T + M_{sc},$$

wherein R denotes tooth number of the ring gear/tooth number of the sun gear, Et denotes an engine torque that the efficiency of the engine is maximized, and Msc denotes the speed control torque for controlling the engine speed.

6. The apparatus of claim 5, wherein when the brake is locked up, the controller sets the torque of the first motor/generator to be zero.

7. The apparatus of claim 1, wherein the conversion condition is satisfied when a vehicle speed is lower than a reference speed for converting the driving mode to the engine coupling mode, a driver required power is less than a reference power for converting the driving mode to the engine coupling mode, and an absolute value of a speed of the first motor/generator is within a predetermined range over a predetermined time.

8. A method for controlling a transmission system of a hybrid electric vehicle including a planetary gear set disposed on an input shaft receiving power of an engine; two input gears connected respectively to two rotation elements among three rotation elements of a sun gear, a ring gear and a planet carrier of the planetary gear set; first and second motor/generators disposed on an intermediate shaft and a connecting shaft disposed in parallel with the input shaft; two intermediate gears connected respectively to first and second rotors of the first and second motor/generators; a brake selectively connecting the first rotor of the first motor/generator to a transmission housing; and two output gears fixedly disposed on an output shaft disposed in parallel with the intermediate shaft and transmitting power transmitted through one input gear of the two input gears or one intermediate gear of the two intermediate gears to a final reduction gear of a differential apparatus; the method comprising:
determining, by a controller, whether a conversion condition for converting a driving mode from a power split mode to an engine coupling mode is satisfied;
performing, by the controller, a slip control or a nonslip control supplying control hydraulic pressure to the brake for locking up the brake according to a brake capacity through an oil pump when a driving mode is the power split mode and the conversion condition is satisfied; and
performing a reaction force control for controlling reaction force of the sun gear connected to the first motor/generator among the three rotation elements of the planetary gear set, by the controller.

9. The method of claim 8, wherein the conversion condition is satisfied when a vehicle speed is lower than a reference speed for converting the driving mode to the engine coupling mode, a driver required power is less than a reference power for converting the driving mode to the engine coupling mode, and an absolute value of a speed of the first motor/generator is within a predetermined range over a predetermined time.

10. The method of claim 8, wherein the slip control includes:
supplying an initial hydraulic pressure to the brake;
supplying a middle control hydraulic pressure to the first motor/generator; and
supplying a maintaining hydraulic pressure to the brake when the brake is locked up.

11. The method of claim 10, wherein the middle control hydraulic pressure is increased with a rotation speed of the first motor/generator between the initial hydraulic pressure and a maximum hydraulic pressure for locking the brake.

12. The method of claim 8, wherein the nonslip control includes:
supplying an initial hydraulic pressure to the brake;
supplying a maximum hydraulic pressure by which the brake is locked up; and
supplying a maintaining hydraulic pressure to the brake when the brake is locked up.

13. The method of claim 8, wherein under the reaction force control, a torque of the first motor/generator is controlled for dividing engine power to the ring gear and the sun gear of the planetary gear set,
the torque of the first motor/generator is determined by summation of a reaction torque of an engine torque and a speed control torque for controlling an engine speed, and
the torque of the first motor/generator is determined from following equation of $$M_T = \frac{-1}{1+R} \times E_T + M_{sc},$$

wherein R denotes tooth number of the ring gear/tooth number of the sun gear, Et denotes an engine torque that the efficiency of the engine is maximized, and Msc denotes the speed control torque for controlling the engine speed.

* * * * *